United States Patent
Neos

(10) Patent No.: US 9,240,207 B1
(45) Date of Patent: Jan. 19, 2016

(54) MINIMIZATION OF VCM-RESOLUTION SWITCHING INDUCED POSITION ERROR TRANSIENTS

(71) Applicant: Marvell International Ltd., Hamilton (BM)

(72) Inventor: Perry Neos, Los Altos, CA (US)

(73) Assignee: Mavell International Ltd., Hamilton (BM)

(*) Notice: Subject to any disclaimer, the term of this patent is extended or adjusted under 35 U.S.C. 154(b) by 5 days.

(21) Appl. No.: 14/223,942

(22) Filed: Mar. 24, 2014

Related U.S. Application Data

(62) Division of application No. 12/180,476, filed on Jul. 25, 2008, now Pat. No. 8,730,772.

(60) Provisional application No. 60/955,181, filed on Aug. 10, 2007.

(51) Int. Cl.
| | | |
|---|---|---|
| G11B 5/09 | (2006.01) | |
| G11B 20/10 | (2006.01) | |
| G11B 27/36 | (2006.01) | |

(52) U.S. Cl.
CPC .......... *G11B 20/10037* (2013.01); *G11B 27/36* (2013.01)

(58) Field of Classification Search
CPC ............... G11B 5/5547; G11B 5/5556; G11B 20/10037
USPC .......... 369/53.28, 53.35, 53.23, 47.35, 59.21; 360/39
See application file for complete search history.

(56) References Cited

U.S. PATENT DOCUMENTS

| | | | |
|---|---|---|---|
| 4,649,464 A | 3/1987 | Shono | |
| 6,043,768 A * | 3/2000 | Strasser | G01D 18/006 341/140 |
| 6,445,323 B1 * | 9/2002 | Cairns | G09G 3/3688 341/144 |
| 6,879,549 B2 * | 4/2005 | Kim | G11B 7/08517 360/78.06 |
| 7,200,091 B2 * | 4/2007 | Masui | G11B 7/0062 369/53.26 |
| 7,504,972 B2 * | 3/2009 | Deligiannis | H03M 1/20 341/126 |
| 7,773,479 B1 * | 8/2010 | Sutardja | G11B 7/126 369/116 |
| 2005/0201497 A1 * | 9/2005 | Ma | H03G 3/3052 375/345 |
| 2005/0270918 A1 * | 12/2005 | Yen | G11B 7/09 369/44.27 |

* cited by examiner

*Primary Examiner* — Thomas Alunkal

(57) ABSTRACT

Systems, methods, and devices for selecting modes of operation include, in at least one aspect, a method including: selecting a first mode associated with digital-analog conversion; determining whether a second mode associated with digital-analog conversion is available; if the second mode is available, evaluating one or more switching parameters associated with the second mode; switching from the first mode to the second mode if the one or more evaluated switching parameters satisfy one or more predetermined criteria; analyzing one or more performance parameters after switching from the first mode to the second mode; and setting the second mode as a default mode of operation if the one or more analyzed performance parameters are satisfactory.

18 Claims, 12 Drawing Sheets

MINIMIZATION OF VCM-RESOLUTION SWITCHING INDUCED POSITION ERROR TRANSIENTS

CROSS-REFERENCE TO RELATED APPLICATIONS

This application is a divisional of and claims the benefit of the priority to U.S. patent application Ser. No. 12/180,476, filed Jul. 25, 2008, titled "MINIMIZATION OF VCM-RESOLUTION SWITCHING INDUCED POSITION ERROR TRANSIENTS," now U.S. Pat. No. 8,730,772, which claims priority to U.S. Provisional Application Ser. No. 60/955,181 titled "MINIMIZATION OF VCM-RESOLUTION SWITCHING INDUCED POSITION ERROR TRANSIENTS," filed on Aug. 10, 2007, the disclosure of which is incorporated herein by reference in its entirety.

TECHNICAL FIELD

The subject matter of this application is generally related to electrical circuits.

BACKGROUND

A digital data storage system can include a hard disk drive (HDD) that stores data on a storage media such as magnetic or optical data storage disks. In magnetic disk storage systems, the hard disk drive includes at least one hard disk in the form of a rigid platter, a head assembly for reading and writing data on the platter, and a controller for controlling the head assembly.

During a "read" or "write" operation, the head assembly scans the hard disk platter surface. The read/write head inside the head assembly is conventionally driven by a voice coil motor (VCM) and generally supported by an actuator arm for reading data from or writing data to a desired track on the platter. When current is fed to the VCM, the VCM develops force or torque which is substantially proportional to the applied current. The arm acceleration is therefore substantially proportional to the magnitude of the current. When the read/write head is near the desired track, a reverse polarity signal can be applied to the actuator arm, causing the read/write head to stop directly over the desired track.

Modern HDD throughout and storage capacity have been substantially enhanced by improvement in actuator design which has resulted in increased precision and speed in head placement. The more precisely and quickly the actuator arm can place the read/write head, the greater the amount of data that can be packed onto a given area of disk surface and the quicker such data can be accessed. The demand for increased speed and storage capacity has resulted in ever faster and more compact hard disk drive assemblies. Because speed is one of the dominant factors in determining the overall hard drive performance, conventional technologies have focused heavily on maximizing speed. However, the increase in speed frequently comes at the expense of head precision, producing undesirable errors and causing unrecoverable data.

SUMMARY

Systems, methods, computer-readable mediums products are described for adjusting center values referenced by various modes used in a digital analog converter of a disk drive. Specifically, the disk drive may include a center value adjusting module which may function to monitor the center values of the modes and adjust (or readjust) the center values as necessary to ensure the accuracy of a voltage range referenced by each mode. In some implementations, position errors generated by the disk drive also may be fed back to the center value adjusting module and used for recalibration of the voltage range so as to minimize the number of transient position errors that can displace the head of the disk drive.

In some implementations, a method includes: switching between a first mode and a second mode, obtaining a first error value associated with switching from the first mode to the second mode; obtaining a second error value associated with switching from the second mode to the first mode; determining a total error value based on the first error value and the second error value; and determining an adjustment value based on the total error value and a value of an associated resolution gain.

In some implementations, a method includes: selecting a first mode associated with digital-analog conversion; determining whether a second mode associated with digital-analog conversion is available; if the second mode is available, evaluating one or more switching parameters associated with the second mode; switching from the first mode to the second mode if the one or more evaluated parameters satisfy a predetermined criteria; analyzing one or more performance parameters after switching from the first mode to the second mode; and setting the second mode as a default mode of operation if the one or more analyzed parameters are satisfactory.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Hard Disk Drive System Overview

Figure 1:
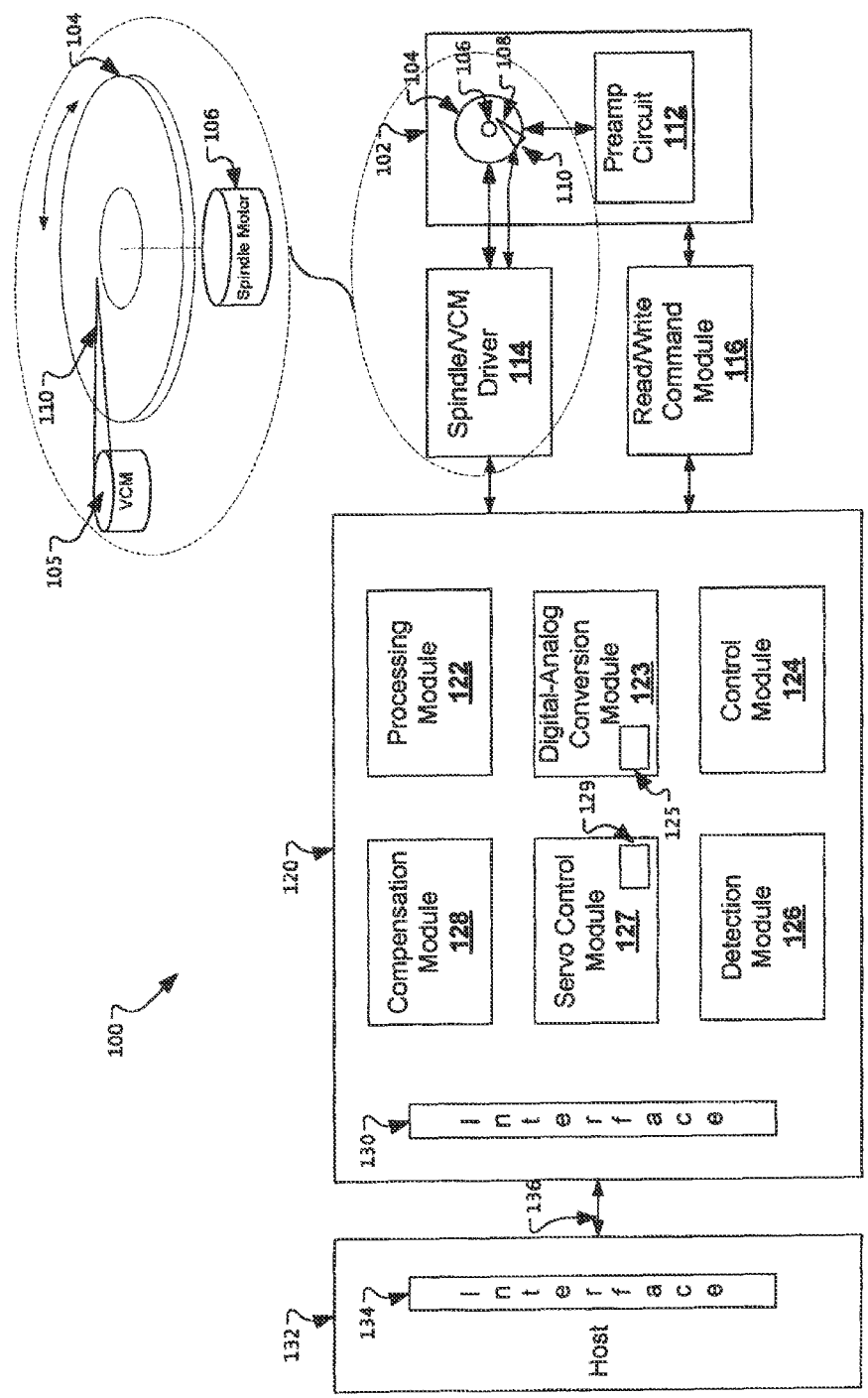
FIG. 1 shows an example hard disk drive system.

FIG. 1 shows an example hard disk drive (HDD) system 100. As shown in FIG. 1, the HDD system 100 includes a printed circuit board (PCB) 120. The PCB 14 includes processing module 122, a digital-analog conversion module 123 having a digital analog converter 125, a control module 124, a detection module 126, a servo control module 127 including an adjustment module 129, a compensation module 128 and a communications interface 130, each of which is connected through one or more internal buses (not shown).

The processing module 122 may perform data and/or control processing related to the general operation of the HDD system 100. For example, the processing module 122 may execute instructions received from the control module 124 to control disk drive functions. These functions may include, for example, reading and decoding host commands, starting up and controlling the speed of the spindle motor 106, minimizing head positioning servo off track error through the control of the voice coil motor (VCM) 105, and managing power consumption of the HDD system 100.

The processing module 122 may include volatile memory (e.g., SDRAM or other types of low latency memory) for storing, for example, volatile control data associated with the control of the HDD system 100, and non-volatile memory (e.g., flash memory) for storing, for example, critical data such as non-volatile control code. The control data and control code may include instructions the processing module 122 executes or utilizes as well as tables, parameters or arguments used during the execution of these instructions. In some implementations, the processing module 122 also may store various firmware routines for controlling the operation of the spindle motor 106 such as, without limitation, startup routines, speed control routines, spin down routines and parking routines.

The processing module 122 may include registers and buffers for storing, for example, flags indicating whether a spin-up operation has been successfully completed. Alternatively, the flags may be stored in a register defined by a memory location in a memory unit separate from the processing module 122.

In some implementations, the processing module 122 may include a pulse width modulation (PWM) controller (not shown) for generating control signals so as to control the spindle/VCM driver 114 to drive the spindle motor 106 at a substantially constant speed while the disk drive is in use.

In other implementations, the spindle/VCM driver 114 may receive VCM control signals from the PVM controller and generate a corresponding command signal to command a voice coil motor (VCM) 105 for positioning the actuator arm 110 and the read/write head 108, for example, as part of a parking operation. The voice coil motor 105 may be controlled by the servo control module 127, and may be configured to apply torque to the read/write head 108 to swing the read/write head 108 during, for example, a track-seeking operation and to maintain the head 108 at a desired angular position during a track-following operation.

The spindle/VCM driver 114 may, in some implementations, include an electromotive force (EMF) detector (not shown) for detecting a back EMF (BEMF) associated with one or more windings of the spindle motor. The control module 124 may communicate with the spindle/VCM driver 114, for example, to receive zero crossing information to be used for identifying the instant at which a zero crossing occurs (e.g., a zero crossing in the BEMF induced in a floating winding), and for determining a spin-rate of the spindle motor. As an example, while the spindle motor 106 is rotating, the EMF detector may detect the BEMF zero crossing point for an un-driven winding to generate a zero crossing signal (e.g., by counting clock pulses and determining the time elapsed between the consecutive detected zero crossings). The control module 124 may receive the zero crossing signal and provide the zero crossing information to the processing module 122 to compute the velocity of the spindle motor 106.

The control module 124 may function to manage and handle data transfer between the PCB 120 and the host 132 during read and write operations through the communications interfaces 130/134. The control module 124 also may include servo logic for managing the positioning of the read/write head 108 when seeking (e.g., moving from one track to a non-adjacent track) and during tracking (e.g., staying on a single track).

The control module 124 may communicate with the communications interface (e.g., and input/output interface) 130 and with the spindle/VCM driver 114 or the read/write command module 116. The control module 124 may coordinate control of the spindle/VCM driver 114, the read/write command module 116, the processing module 122, the compensation module 128 and the detection module 126.

The control module 124 may receive a command from the host computer 132 to generate a spin-up command while spindle motor 106 is at rest to begin the spin-up mode of operation. The processing module 122 may receive the spin-up command from the control module 124 and retrieve an associated control routine for the spin-up mode of operation from a memory unit.

During write operations, the read/write command module 116 may encode (e.g., using, run length limited coding (RLL)) data to be written by the read/write head 108 and generate encoded write signals. The read/write command module 116 also may process the write signals providing a reliability check and may apply, for example, error correction coding (ECC) and similar algorithms to allow for the verification of the integrity of the data that is written. During read operations, the read/write head 108 may generate read signals (e.g., analog signals), and the read/write command module 116 may convert the read signals into digital read signals. The converted signals may be detected and decoded by conventional techniques to recover data written by the read/write head 108.

Hard Disk Drive Assembly

The HDD head assembly 102 may include one or more magnetic platters 104 for storing magnetic data. The platters 104 may be rotated by a spindle motor 106. The spindle motor 106 may rotate the magnetic platters 104 at a controlled speed during the read/write operations. The read/write actuator arm 110 may move relative to the magnetic platters 104 in order to read and/or write data to/from the magnetic platters 104. The spindle/VCM driver 114 may be configured to control the spindle motor 106, which rotates the magnetic platters 104. If desired, the spindle/VCM driver 114 also may generate control signals for positioning the read/write actuator arm 110 using the voice coil actuator 105, a stepper motor or any other suitable actuator.

The read/write head 108 may be located near a distal end of the read/write actuator arm 110. The read/write head 108 may include a write element (e.g., an inductor) that generates a magnetic field, and a read element (e.g., a magneto-resistive (MR) element) that senses the magnetic field on the magnetic platters 102.

The HDD head assembly 102 also may include a preamp circuit 112. The preamp circuit 112 may operate either in a read mode or write mode, and may communicate with one or more transducers (not shown). A transducer may generate a low level analog read signal, and send the analog read signal to the preamp circuit 112 to produce an amplified read signal. During a user-data read operation, the amplified read signal serially defines the servo information and user data. The servo information may include positioning data information such as track identification data information and fine positioning information. During a write operation, the preamp circuit 112 also may provide write current via a write data signal to a selected transducer for writing a sequence of symbols onto the magnetic platters 104. The write current changes polarity upon each change in the binary value of the write data signal.

In some implementations, portions of the HDD system 100 may be implemented as one or more integrated circuits (IC) or chips. For example, the processing module 122 and the control module 124 may be implemented in a single chip. As another example, the spindle/VCM driver 114 and the read/write command module 116 may be implemented in a same (or different) chip as the processing module 122 and the control module 124. As yet another example, the HDD system 100 other than the HDD head assembly 102 may be implemented as a system-on-chip.

In general, the spindle motor 106 may have different power requirements based on different operational configurations. For example, initial acceleration (e.g., during spin-up process) of the spindle motor 106 may require a high value of current relative to operation at steady-state velocity. As the spindle motor 106 reaches a desired operating velocity, the average motor current requirement may decrease substantially to maintain the head at a desired track.

Servo Control Module

Information may be stored on each platter 104 in concentric tracks. The data tracks are usually divided into sectors. Information may be written to and/or read from a storage surface(s) of a disk by the read/write head 108. The read/write head 108 may be mounted on the actuator arm 110 capable of moving the read/write head 108, e.g., radially over the platter 104. The movement of the actuator arm 110 may allow the read/write head 108 to access different data tracks. The platters 104 may be rotated by the spindle motor 106 at a relatively high speed, which may allow the read/write head 108 to access different sectors within each track on the platter 104.

Operation of the actuator arm 110 may be controlled by the servo control module 127. The servo control module 127 may move the read/write head 108 according to two primary operations; seek control operation and track following operation.

In a seek control operation, the servo control module 127 controls the actuator arm 110 such that the read/write head 108 is moved from an initial position to a target track position for which the host 132 has requested. A seek control operation generally includes accelerating, decelerating and settling (or maintaining) the VCM 105 at a predetermined speed. In general, the servo control module 127 may initiate a seek control operation when the host 132 issues, for example, a seek command to read data from or write data to a target track on the platters 104.

As the read/write head 108 approaches a target track, the servo control module 127 may settle the actuator arm 110. During settling, the servo control module 127 may bring the head 108 to rest over a target track within a selected settle threshold or window, which may be based on a percentage of the track width from the center of the track. The servo control module 127 may employ, for example, a pre-loaded algorithm, to ensure that the head 108 is positioned on the target track with sufficient accuracy to write (and read). This process may require counting servo position samples occurring within the settle window. For example, a write operation may be initiated after observing one or more consecutive positioning samples that are within certain area of a data track. Of course, a wide variety of settle criteria may be employed, in ensuring positioning accuracy.

After the head 108 is settled over a desired track, the servo control module 127 may initiate the track following mode. In the tracking mode, the head 108 may be positioned and maintained at a desired position with respect to the target track (e.g., over a centerline of the track) or over a defined radial location along a track on the disk until desired data transfers are complete and another seek is performed, as will be discussed in further detail below.

The digital-analog conversion module 123, which includes a digital-analog converter 125, can operate to convert data between the digital form used by the PCB 120 and the analog form conducted through the head 108 in the HDD head assembly 102. The HDD head assembly 102 can provide servo positional information read by the head 108 to the servo control module 127. Servo sectors on each of the platters 104 can include head location information, such as a track identification field and data block address, for identifying a target track and data block, and burst fields to provide servo fine location information. The head location information read by the head 108 may be converted from analog signals to digital data by the digital-analog converter 125, and fed to the servo control module 127. The servo positional information can be used to detect the location of the head 108 in relation to a target track or target data sectors on the platters 104. The servo control module 127 may utilize, for example, target data sectors and servo positional information to precisely place the head 108 over the target track and data sector on the platters 104, and to continuously maintain the head 108 aligned with the target track while data is written/read to/from one or more identified data sectors.

Servo Data Measurement Overview

As discussed above, servo data enables measurement or estimation of various parameters including position of the head 108 and the velocity and acceleration of the VCM 105, and is used in a closed-loop control of the head position. For example, during a track following operation where the head 108 is controlled to follow a selected track on the disk, track mis-registration (TMR) may be determined using a position error signal generated from servo information on the platters 104 to indicate relative distance between the head 108 and the centerline of a selected track. In some implementations, the position error signal may be used to generate correction signals for adjusting the head position by modifying the current applied to the VCM 105. Similarly, in a seek control operation during which the head 108 is accelerated subsequently decelerated from an initial track to a target track, the measured or estimated radial velocity of the head 108 may be compared to a model or profile velocity, with correction signals being generated from the differences between the actual velocity and the profile velocity of the head 108.

In a closed loop servo system, servo data provided to the servo control module 127 (and/or to the processing module 122) may include information indicating track positioning of the head 108 over a rotating platter. The track positioning information indicates the track over which the head 108 is placed, as well as any misalignment of the head 108 relative to a track. Servo data may be recorded periodically along each track in servo sectors on the rotating platter 104 (e.g., between other non-servo data). In general, the servo control module 127 may determine, for example, tolerance analysis of head parameters, positioning accuracy (e.g., as measured by track mis-registration), and track overshoot/undershoot from the servo data read by the head 108, and generate a servo current command signal to properly control the spindle motor 106 (via the spindle/VCM driver 114) so as to correct any track misalignment that may have occurred during data read and write.

Digital-Analog Conversion Module and Digital-Analog Converter

The digital-analog conversion module 123 may include a digital-analog converter (DAC) 125 for converting control signals (e.g., for controlling the position of the head) generated by the control module 124 into analog signals (and from analog signals into digital data). For example, a head position signal may be generated by the control module 124 and provided to the DAC 125. The DAC 125 then may convert the head position signal into an analog signal (e.g., a voltage signal) for driving the VCM 105 coupled to the actuator arm 110. The actuator arm 110 may subsequently move the head 108 along the surface of the platters 104 based on the analog signal provided by the DAC 125.

In some implementations, the DAC 125 may be configured to output, for example, different analog voltage ranges to account for resolution needs at different operating conditions. In these implementations, the DAC 125 may have one or more selectable modes. For example the DAC 125 may provide a voltage range of −0.1 to 0.1 volt in mode A, a voltage range of −0.2 to 0.2 volt in mode B, a voltage range of −0.4 to 0.4 volt in mode C, and a voltage range of −0.8 to 0.8 volt in mode D. Of course, these numbers merely illustrative, and other voltage ranges also may be employed to suit a particular design application.

In some implementations, the DAC 125 may utilize certain modes (i.e., referred to here as "higher modes") to provide a larger voltage range and bigger current scale but at a lower resolution (volts/digital count). In these implementations, higher modes may be used, for example, during seeking control operations where a large voltage range is generally desirable. Conversely, the DAC 125 may employ other modes (i.e., referred to here as "lower modes") to provide a higher resolution (e.g., smaller voltage steps per digital count). Lower modes may be used, for example, for tracking following operations where high resolution is critical to servo tracking performance.

Figure 2:
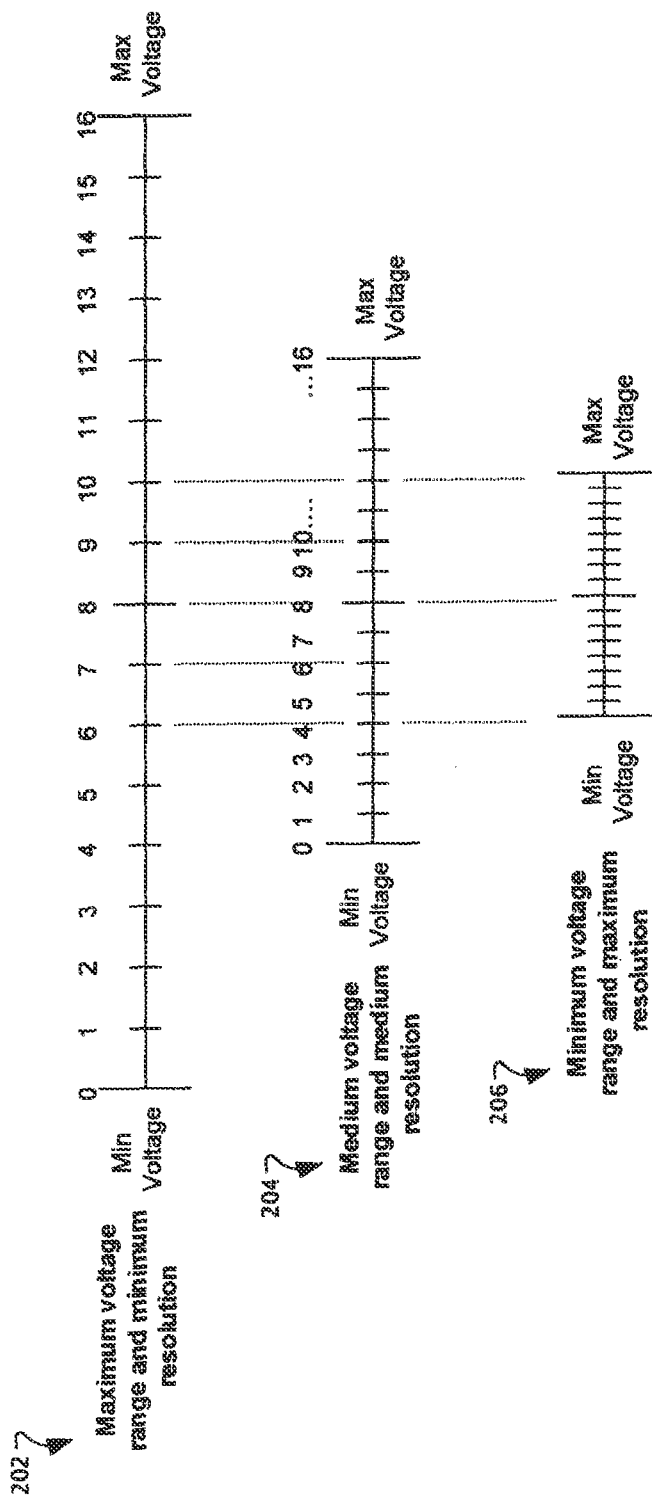
FIG. 2 shows three example modes used by a digital-analog converter with each having a different voltage range and resolution setting.

In operation, the DAC 125 may operate under a large voltage/low resolution mode during seeking, and gradually switch over to a low voltage/high resolution mode as the head 108 approaches a target track (or reaches a desired head position) during track following to improve tracking performance. FIG. 2 shows three example modes of operation, each with a different voltage range and resolution settings.

Referring to FIG. 2, in the example shown each mode 202, 204 and 206 includes sixteen discrete DAC counts each representing a tracking current count, and has a center value of eight. As shown, for each of the modes, the DAC's count range may span from 0 to 16 (i.e., a total of 17 distinct outputs provided by the DAC 125). For example, assuming that the maximum voltage swing a hard disk drive may provide is 2 volts (e.g., a range from −1 volt to 1 volt), under the first mode 202, the 2-volt voltage swing may span the entire count range such that when the DAC 125 operates under the "0" DAC count, −1 volt may be output. As another example, if the "8" DAC count is selected, then 0 volt may be output. As yet another example, if the "16" DAC count is selected, then 1 volt may be output. The first mode 202 may be suitable, for example, for seek control operations where the level of resolution is less crucial but a large voltage scale can provide a large voltage sweep available for track seeking.

Switching the DAC 125 between various modes allows the VCM 105 to adapt to varying speed in precisely locating a desired track (e.g., during seeking) and maintain the head 108 over the desired track (e.g., during track following). By varying the voltage range and resolution in accordance with the needs of HDD head assembly 102, hard drive performance can be optimized. Thus, in cases where the head 108 is operating under track following, the first mode 202 may be switched to a second mode 204. The second mode 204 has a smaller voltage step per count as a result of an increase in resolution (e.g., higher resolution than the minimum resolution in the first mode 202).

More specifically, when the first mode 202 is switched to the second mode 204, though the number of DAC counts remain the same, the range of the voltage swing is cut in half. That is, while each DAC count in the first mode 202 is substantially equal to ⅛ of a volt (for a 2volt voltage swing equally distributed by 16 DAC counts), each DAC count in the second mode 204 is only 1/16 of a volt. Specifically, while the DAC 125 may increase or decrease its output voltage along the scale at a increment of +/−⅛ of a volt in the first mode 202, each DAC count in the second mode 204 offers +/−1/16 of a volt, which is at a higher resolution than that provided by the first mode 202. Because the voltage range provided by the second mode 204 has a smaller voltage step per count, the DAC 125 can use a smaller voltage sweep (e.g., smaller than that provided by the first mode 202) to provide the same magnitude of output to drive the VCM 105 as that provided by the first mode 202.

The third mode 206 provides a minimal voltage sweep. In the third mode 206, the voltage step per count becomes even smaller due to a further increase in resolution, which imposes a larger voltage requirement for the DAC 125 to drive the VCM 105. Using the example given above where the above where the DAC 125 operates within a track range that includes DAC counts 7-9 under the first mode 202, to obtain the same voltage output in the third mode 206, the DAC 125 may need to be set at a track range within the 4-12 DAC counts. Another way to think of it is if we're To put the foregoing operation in a different perspective, in the first mode 202, the DAC 125 can afford a voltage variation of +/−⅛ of a volt at each of the 16 steps on a 2volt voltage swing (assuming 0 volt corresponds to the DAC count of "8" on a 16-step 2-volt voltage swing). Even if finer adjustment may be needed, the output voltage cannot be modified with a voltage smaller than ⅛ step. However, in the third mode 206, because a +/−1 count dither corresponds to +/−1/32 of a volt, the output voltage can be further refined to accommodate 1/32 of a volt, which is much finer than the ⅛ of a volt provided in the first mode 202. Thus, in the first mode 202 where the DAC count of 7 is selected (and assuming that the DAC count of 8 is calibrated at 0 volt with a voltage sweep of 2 volts across the 16 steps), then a DAC count of 7 indicates that −⅛ of a volt is being output.

When the first mode 202 is switched to the second mode 204, which covers only half the voltage range than in the first mode 202, two DAC counts below the zero level would need to be output to provide the same voltage (i.e., −⅛ of a volt). This is so because two DAC counts are needed in the second mode 204 to sweep the equivalent voltage of one DAC count in the first mode 202. If the zero voltage level of the second mode 204 is aligned with the zero voltage level of the first mode 202 (e.g., at a DAC count of 8), then to output −⅛ of a volt in the second mode 204, the DAC 125 may be set at the DAC count of "6" (i.e., subtracting two DAC counts from the DAC count of 8). Similarly, in the third mode 206, the DAC 125 may be set at the DAC count of 4 (i.e., subtracting four DAC counts from the DAC count of 8).

Figure 3:
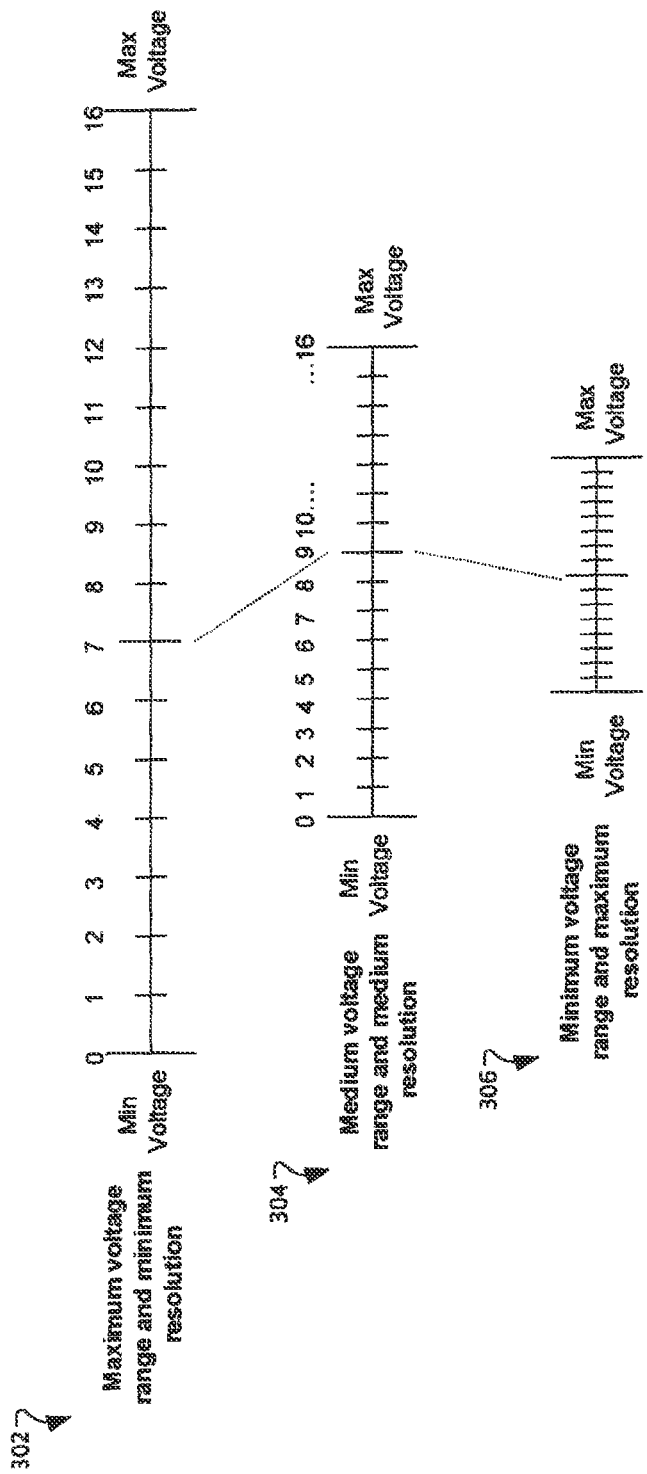
FIG. 3 shows three example modes used by a digital-analog converter with inaccurate center values.

When switching modes over time (e.g., between mode 202 and mode 204, between mode 204 and mode 206, etc.), respective center values may deviate from the desired center value, causing a reference mismatch among the modes. More specifically, the center values among various modes may not line up properly because of the way the HDD system 100 internally generates voltage ranges. For example, the HDD system 100 may utilize voltage dividers and various voltage reference to establish the corresponding voltage ranges. However, mechanical imperfections and minor voltage variations between internal components and circuitry within the HDD system 100 may contribute to the misaligned DAC center values. Additionally, the DAC center values may vary based on temperature during the course of operation. As a result, the center values of the modes may not align correctly with respect to other modes. FIG. 3 shows such a phenomenon.

Referring to FIG. 3, constant switching between the modes 302/304/306 has caused the VCM 105 reference a different value (e.g., "7" in the first mode 302 and "9" in the second mode "9") as the zero voltage level (hereinafter "center value") of the first mode 302 and the second mode 304, respectively. Specifically, first mode 302 shows that the center value corresponds to a DAC count of 7, which provides a voltage range from $-\frac{7}{8}$ of a volt to 1 volt (e.g., because each step is $\frac{1}{8}$ of a volt at a 2-volt per 16 steps voltage range). In the second mode 304, the center value is shifted to the DAC count of 9, which is equivalent to a voltage range of $-\frac{9}{16}$ to $\frac{7}{16}$ of a volt (e.g., because each step is $\frac{1}{16}$ of a volt as the DAC 125 now covers only half the voltage range of 1 volt).

When the center values are not aligned, there is a reference mismatch. This reference mismatch can subsequently give rise to transient position errors. In some instances, the position errors can be large enough to knock the head 108 off-track, or alternatively, cause a displacement between the head 108 and a target track. For example, in the first mode 302, a track range of 6-8 provides an output voltage of $+/-\frac{1}{8}$ of a volt (since the DAC count of 7 is 0 volt). When the first mode 302 is switched to the second mode 304 (e.g., without changing the output voltage), a track range 6-8 in the first mode 302 would translate into a track range of 5-9 range in the second mode 304. Because the center value set in the second mode 04 is no longer aligned with that set in the first mode 302 (i.e., the center value is no longer at the DAC count of 7), selecting a track range of 5-9 would provide $-\frac{4}{16}$ of a volt to 0 volt, or $-\frac{1}{4}$ of a volt to 0 volt, which is different from the intended $+/-\frac{1}{8}$ of a volt.

This reference mismatch can subsequently give rise to transient position errors. In some instances, the position errors can be large enough to knock the head 108 off-track, or alternatively, cause a displacement between the head 108 and the target track. To cure these position errors, a substantial amount of time may be required for internal adjustment to reconfigure the position of the head 108, thereby creating an undesirable delay for reading and writing data. In instances where position errors occur during the transition from seeking to settling, the servo control module 127 may incur additional delay in initializing tracking following operations, thereby degrading the overall performance of the HDD system 100.

Figure 4A:
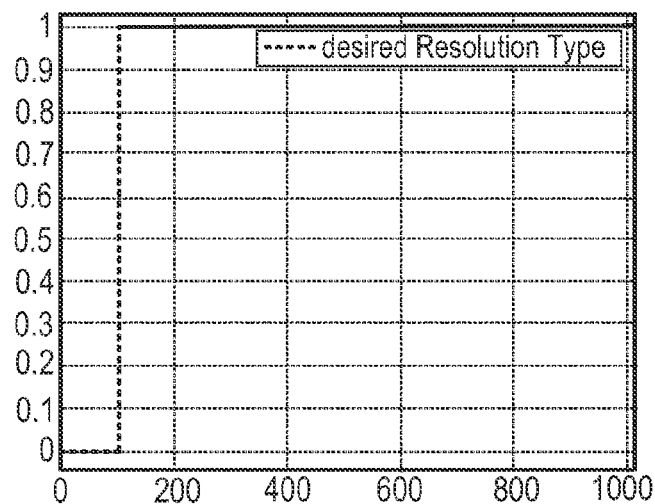
FIGS. 4A-C show an example impact of position errors on the HDD system shown in FIG. 1 when the resolution is switched from "0" to "1".
Figure 4B:
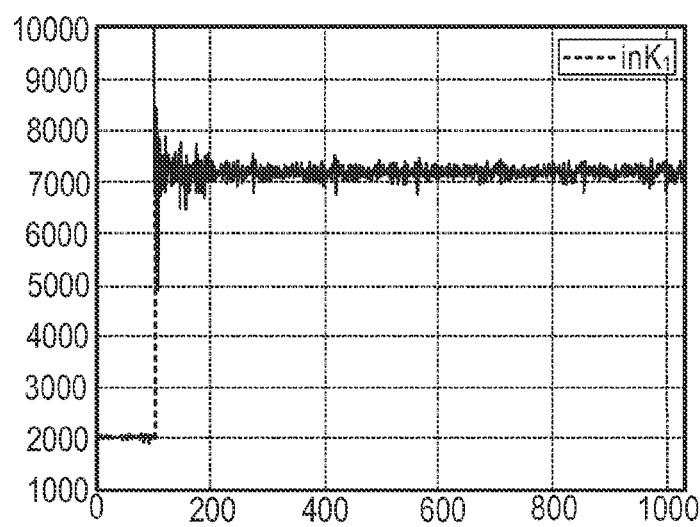
Figure 4C:
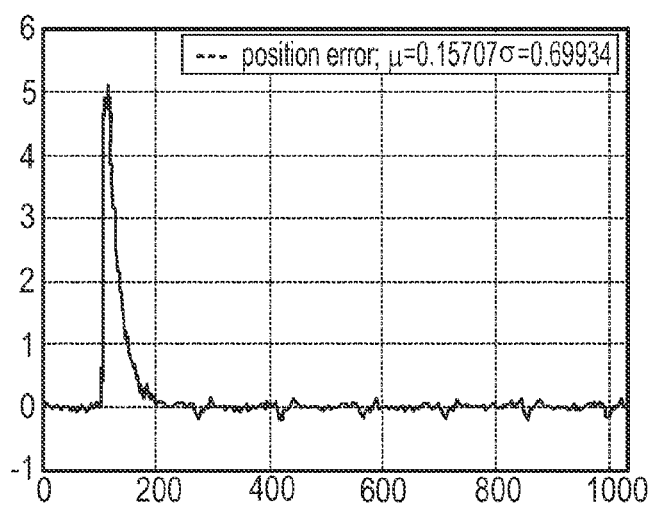

FIGS. 4A-C show an example impact of position errors on the HDD system 100 when the resolution is switched from "0" to "1". As shown in FIG. 4A, the DAC resolution is switched from "0" to "1" at the $100^{th}$ sample. Because of the misaligned center values, the output current overshoots from 2 mA to 10 mA at the time of switching, as shown in FIG. 4B. Referring to FIG. 4C, this increase in the output current causes the head 108 to miss the location of the target track. In this example, it is shown that the head 108 is located ahead of the desired track by five tracks, which takes about 100 samples to be corrected. As shown, at the $200^{th}$ sample, the head 108 is readjusted after the errors are corrected.

Figure 5A:
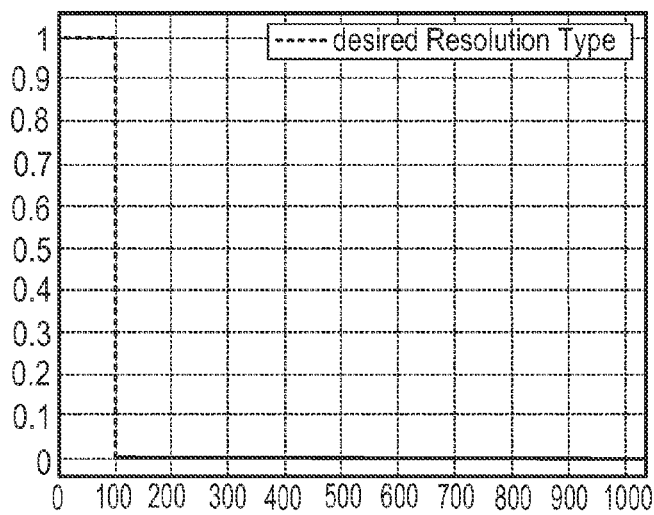
FIGS. 5A-C show an example impact of position errors on the HDD system shown in FIG. 1 when the resolution is switched from "1" to "0".
Figure 5B:
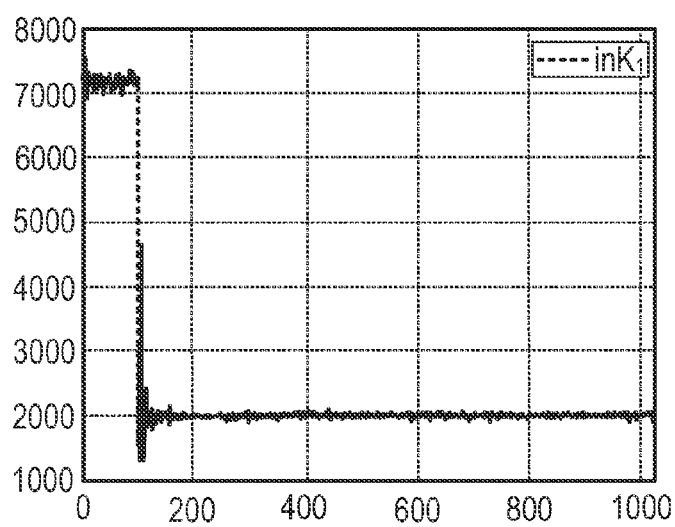
Figure 5C:
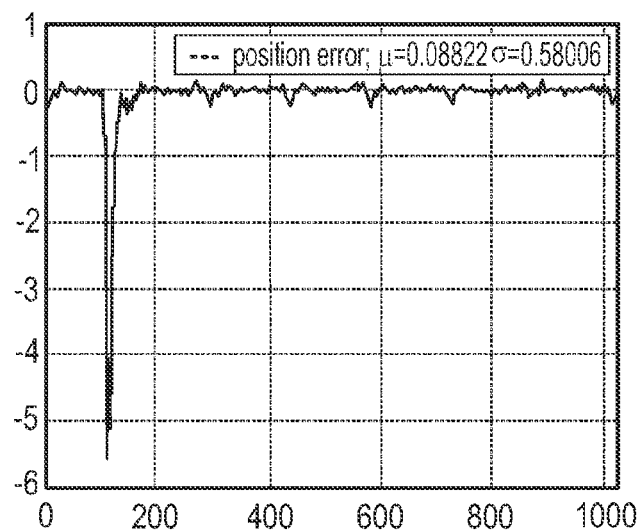

FIGS. 5A-C show an example impact of position errors on the HDD system 100 when the resolution is switched from "1" to "0". As shown in FIG. 5A, the DAC resolution is switched from "1" to "0" at the $100^{th}$ sample. As shown in FIG. 5B, like that shown in FIG. 5B, the misaligned center values causes the output current to undershoot from 7.5 mA to 1.5 mA. Referring to FIG. 5C, this decrease in the output current causes the head 108 to miss the location of the target track. In this example, it is shown that the head 108 is five tracks behind the target track at the time of the switching, which takes almost 70 samples to be corrected.

Transient Position Error Correction

As discussed above, inaccurate center values may lead to undesirable position errors, long delays and performance degradation. Accordingly, in some implementations, the servo control module 127 may include a center value adjusting module 129 for adjusting the center values referenced by the available modes of operation (or "modes" hereinafter). Specifically, the center value adjusting module 129 may monitor the center values of the modes on a regular basis, and adjust (or readjust) the center values as necessary to ensure the accuracy of the voltage range referenced by each mode. In some implementations, the resulting position errors may be fed back to the center value adjusting module 129 and used for recalibration of the voltage range so as to minimize the number of transient position errors that can place the head 108 off-track.

In some implementations, the DAC 125 may switch from an initial mode to a different mode during track following. For example, the DAC 125 may switch from a mode with a low resolution to a mode with a high resolution. In some implementations, the center value adjusting module 129 may monitor and receive transient positions errors incurred during the switching. The received errors may then be analyzed to identify an off-track value (e.g., the number of tracks displaced the head 108), and subsequently generate an adjustment value based on the off-track value. The adjustment value may be used to recalibrate the center values of the modes to ensure a correct voltage range to be identified. Recalibrating the center values may improve track following operations (and seeking operations) by allowing the DAC 125 to identify the correct voltage range for driving the VCM 105, and maintaining the head 108 with respect to a desired track at a speed corresponding to the identified range. Further, the foregoing recalibration process using an adjustment value based on error feedbacks may lessen the mismatch impact on the track following operations by, for example, reducing the number of samples needed to reconfigure the head position (e.g., from one hundred samples shown in FIG. 4C to one sample).

To determine an appropriate adjustment value for adjusting the center values of the modes, position errors may be collected from both directions of mode switching. Specifically, the DAC 125 may switch from resolution "X" to resolution "Y" ("rstX_Y") (i.e., from one mode to another mode) and from resolution "Y" to resolution "X" ("rstY_X"), and position error transients generated from both switching may be collected and analyzed. Using the exemplary illustrations shown in FIGS. 4A-C and FIGS. 5A-C as an example, position errors associated with switching from resolution "0" to resolution "1" and from resolution "1" to resolution "0" may be collected for analysis (e.g., errors occurred between the 100$^{th}$ sample and the 200$^{th}$ sample for the former, and errors occurred between the 100$^{th}$ sample and the 170$^{th}$ sample for the latter). Examining position errors from both directions of switching allows the adjustment value to be further fine-tuned, as will be discussed in greater detail below.

In some implementations, the number of position errors to be collected from each direction for adjustment analysis (e.g., from resolution "X" to resolution "Y" and/or from resolution "Y" to resolution "X")may depend on the number of samples needed to reconfigure the head position. For example, if the head 108 takes 100 samples (as shown in FIG. 4C) to reconfigure the head position on its own, then the servo control module 127 may obtain 100 error values corresponding to the 100 samples for evaluation. (e.g., an error value from each sample). The center value adjusting module 129 may then assess these errors to determine an adjustment value suitable for recalibrating the center values of the modes.

To determine an adjustment value appropriate for a particular resolution (or mode), a total error value "tev" associated with the particular resolution may be determined. In some implementations, the total error value "tev" may be based on summed errors from each direction of the resolution. More specifically, the center value adjusting module 129 may sum up all the position error transients associated with a given resolution in a particular direction, and generate an error value representation of the summed errors. In these implementations, the servo control module 127 may generate an error value "evX_Y" by summing all the received errors associated with switching from resolution "X" to resolution "Y". Similarly, the servo control module 127 may integrate all the collected errors associated with switching from resolution "Y" to resolution "X" to generate an error value "evY_X". Referring to the illustration shown in FIG. 4C, as an example, position errors transients that occurred after switching from resolution "0" to resolution "1" may be summed to generate an error value "ev0_1" that represents a sum of errors occurred between the 100$^{th}$ sample and the 200$^{th}$ sample. Referring to the illustration shown in FIG. 5C, as another example, position errors transients that occurred after switching from resolution "1" to resolution "0"may be summed to generate an error value "ev1_0" that represents a sum of errors occurred between the 100$^{th}$ sample and the 170$^{th}$ sample.

In some implementations, based on the summed error values "evX_Y" and "evY_Y", the total position error value "tev_XY" for a particular resolution can be determined by [1]:

$$tev\_XY=evX\_Y-evY\_X \quad [1]$$

Subtracting the error value "evY_X" from the error value "evX_Y" allows the center value adjusting module 129 to cancel out errors of equal but opposite tracks (e.g., canceling out 5 and −5 tracks), and to identify the number of tracks that the servo control module 127 would need to offset the remaining errors. In some implementations, subtracting the error value "evY_X" from the error value "evX_Y" also allows the errors to become even larger, which may then be used to adjust the DAC center value (e.g., like a gain). As an example, if the error value "evX_Y" is a positive error (e.g., that shown in FIG. 4C), then the error value "evY_X" would be a negative value (e.g., that shown in FIG. 5C). Therefore, the total position error value "tev_XY" would become an even larger position error (e.g., positive-(negative)). Conversely, if the error value "evX_Y" is a negative error, then the error value "evY_X" would be a positive value, which collectively yield a total position error value "tev_XY" of an even larger negative error (e.g., negative-(positive)). In either case, the optimized total error value "tev_XY" may be used to adjust the DAC center value.

In these implementations, a positive total position error value "tev_XY" in equation [1] (i.e., evX_Y>evY_X) may indicate that the head 108 is on a track preceding a desired track (e.g., ahead of five tracks), while a negative total position error value "tev_XY" (i.e., evX_Y<evY_X) may indicate that the head 108 is on a track subsequent to the desired track.

In some implementations, it is contemplated that the total position error value "tev_XY" may further be relined by repeating the above process (e.g., by switching back and forth between resolution "X" and resolution "Y") so as to maximize the number of samples to provide a greater error accuracy and finer assessment of the adjustment value.

In some implementations, the adjustment value "adj_value" can be determined by multiplying the total position error value "tev_XY" by a resolution gain "rst_gain", as can be generally given by [2]:

$$adj\_value=tev\_XY*rst\_gain \quad [2]$$

The resolution gain "rst_gain", in these implementations, may be normalised, or alternatively, empirically determined, for example, to ensure that the total position error value "tev_XY" converges toward zero.

Figure 6:
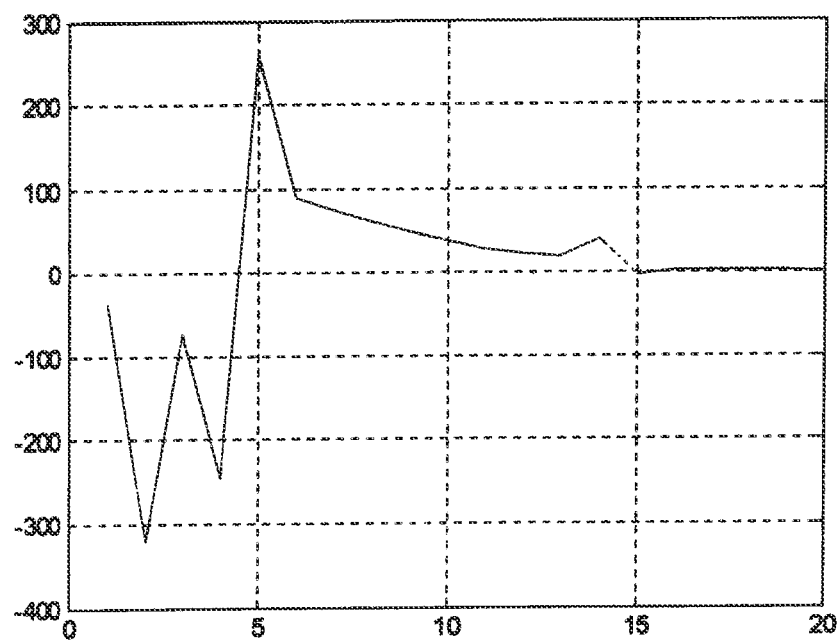
FIG. 6 shows an example graph of a converging position error value.

In some implementations, a small resolution gain may produce a small adjustment value step than a large resolution gain. A small adjustment value step would generally take longer to reach an optimum value. Conversely, a large resolution gain may produce a large adjustment step. However, a large resolution gain would not necessary yield an optimized adjustment value because there is a possibility that the large resolution gain may exceed that which is needed to reach the optimum point. FIG. 6 shows an example graph of this phenomenon.

In FIG. 6, x-axis represents a number of samples and y-axis represents a number of errors corresponding to each sample. As shown, after running the first sample, the total number of errors is in the range of about −40. Then, after running the second sample, the total number of errors becomes about −300. This drastic increase in the number of errors indicates that the adjustment value step is approaching in a wrong direction. To cure this defect, the sign of the resolution gain "rst_gain" is reversed. As a result, after running the fourth sample, the number of errors is reduced to about −220. However, because reversing the sign of the resolution gain "rst_gain" allows the adjustment value to be changed significantly, the fifth sample gains a total of 440 errors (from −220 to +220).

To reduce the impact of the error increase after the fifth sample, in some implementations, the sign of the resolution gain "rst_gain" may again be reversed. To further reduce the number of errors, in these implementations, the magnitude of the resolution gain "rst_gain" may be halved. By doing so, the foregoing process ensures that the next sample does not yield an error rate higher than that of the previous sample. This process may be repeated (e.g., empirically determined) until which the outcome of rst_gain*tev_XY becomes negligible.

As a result, this process establishes a convergent system in which the value of the resolution gain "rst_gain" allows the total position error value "tev_XY" to gradually approach zero. In this manner, when the total position error value "tev_XY" is small, the resolution gain "rst_gain"provides an adjustment value "adj_value" that is substantially zero.

From the adjustment value "adj_value", a new center value "dac_cv (new)" may be obtained by adjusting the old center value "dac_cv (old)" using the adjustment value "adj_value", as can be given by [3]:

$$dac\_cv\ (new) = dac\_cv\ (old) + adj\_value \quad [3]$$

Based on the new center value, the servo control module 125 may adaptively adjust one or more control parameters to recalibrate the position of the head 108.

Exemplary Processes

Figure 7:
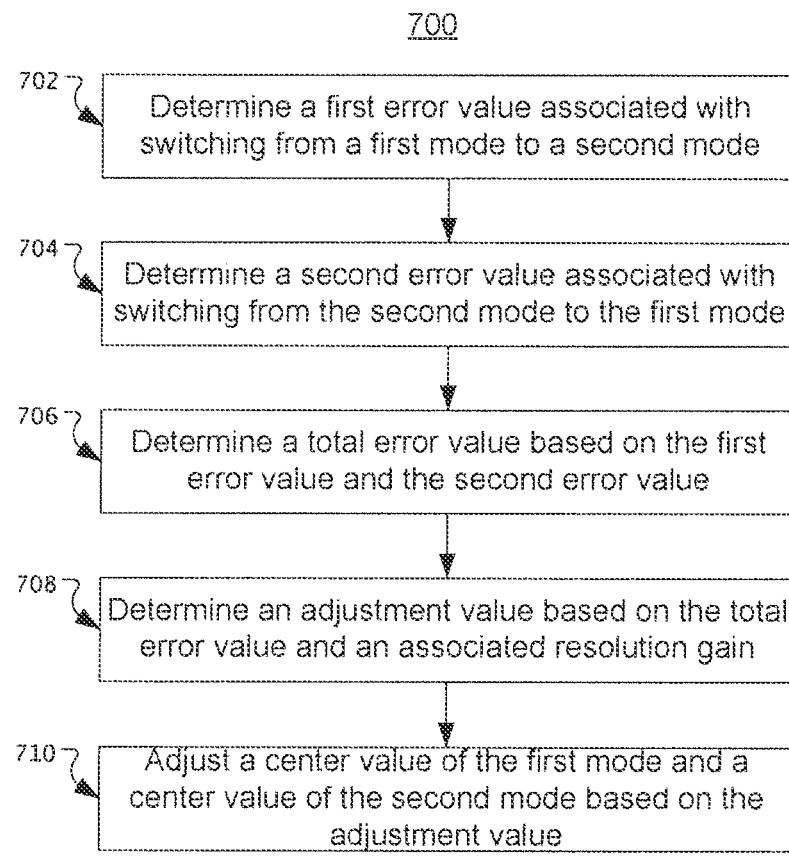
FIG. 7 is a flow diagram showing an example process for adjusting a center value of a mode.

FIG. 7 is a flow diagram showing an example process for adjusting a center value of a mode. The process 700 may be performed, for example, by the HDD system 100, and for clarity of presentation, the description that follows uses the HDD system 100 as the basis of examples for describing the process 700. However another apparatus, system, or combination of systems, may be used to perform the process 700.

As shown in FIG. 7, process 700 begins with determining a first error value associated with switching from a first mode to a second mode (702). For example, assuming the DAC 125 can operate in one of mode "A" (e.g., large voltage range but low resolution) or mode "B" (e.g., small voltage range but high resolution), the DAC 125 may be switched from mode "A" to mode "B", and position errors resulting from switching from mode "A" to mode "B" may be added to generate the first error value.

Next, process 700 includes determining a second error value associated with switching from the second mode to the first mode (704). Using the example given above, the DAC 125 may be toggled from mode "B" to mode "A", and position errors resulting from toggling from mode "B" to mode "A" may be integrated to generate the second error value.

After obtaining the first error value and the second error value, a total error value may be determined based on the first error value and the second error value (706). In some implementations, determining the total error value may include determining a difference between the first error value and the second value, and using the difference as the total error value.

An adjustment value may be determined based on the total error value and an associated resolution gain (708). In some implementations, the resolution gain is provided to ensure that the total error value converges, for example, toward zero. Finally, process 700 includes adjusting at least one of a center value of the first mode and a center value of the second mode based on the adjustment value of (710).

In some implementations, process 700 also may evaluate a third error value associated with switching between a first mode and a third mode. In these implementations, for example, process 700 may determine an error value associated with switching from the first mode to the third mode, followed by determining another error value associated with switching from the third mode to the first mode. Process 700 may compare the error values generated by the switching between the first mode and the second mode, and the comparison result may be used to evaluate the total error value to be used in evaluating the adjustment value. Accordingly, process 700 is not limited to two modes, and may be utilized in a multi-mode environment for determining an appropriate adjustment value.

In some implementations, operations 702-710 may be performed in the order listed, in parallel (e.g., by the same or a different process, substantially or otherwise non-serially), or in reverse order to achieve the same result. In another implementations, operations 702-710 may be performed out of the order shown. For example, process 700 may determine a second error value (704) prior to determining a first error value (702). Also, the order in which the operations are performed may depend, at least in part, on what entity performs the method. Operations 702-710 further may be performed by the same or different entities or systems.

Figure 8:
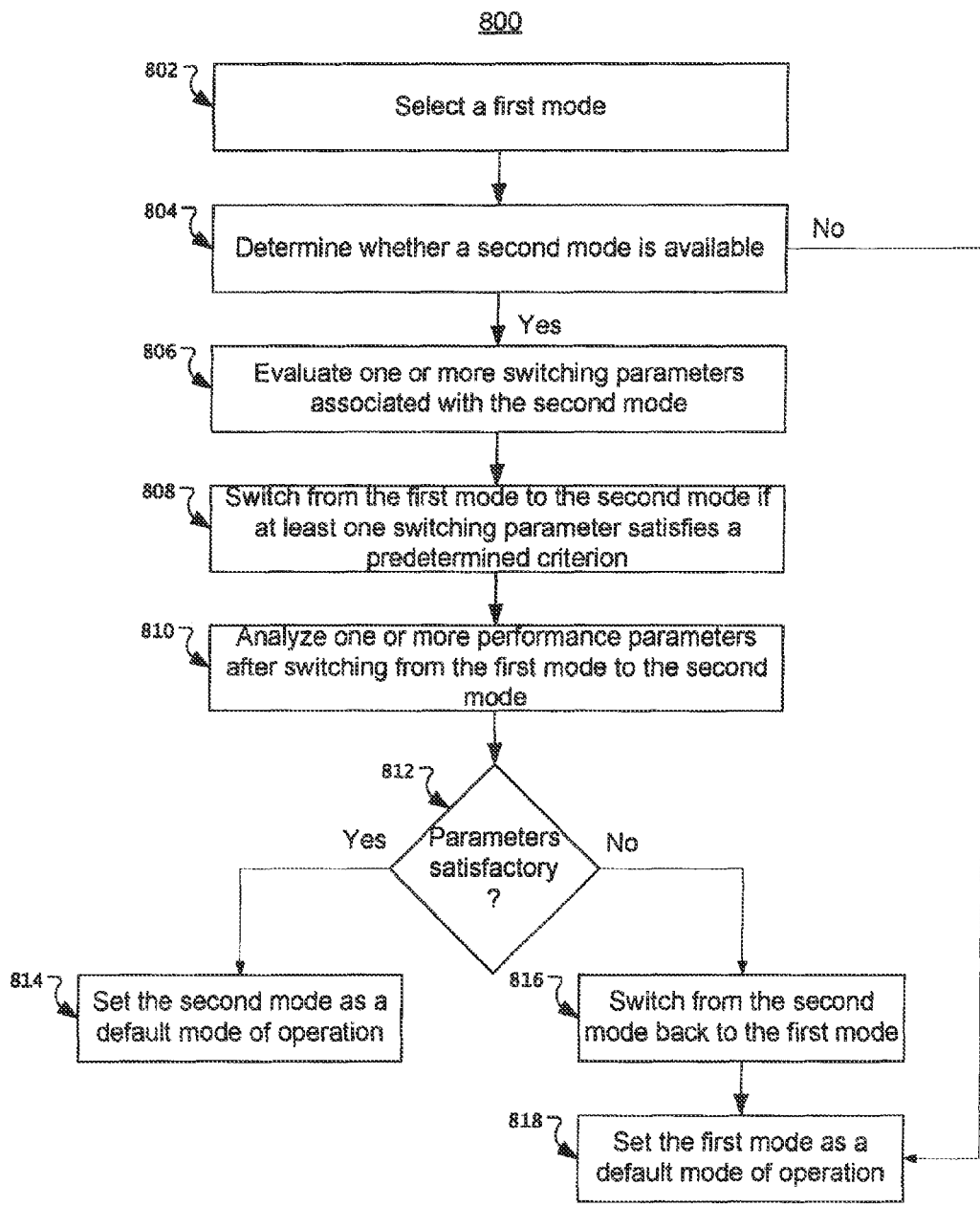
FIG. 8 is a flow diagram showing an example of a mode switching process.

FIG. 8 is a flow diagram showing an example of a mode switching process. The process 800 may be performed, for example, by the HDD system 100, and for clarity of presentation, the description that follows uses the HDD system 100 as the basis of examples for describing the process 800. However, another system, or combination of systems, may be used to perform the process 800.

Referring to FIG. 8, process 800 begins with selecting a first mode (802). In some implementations, selecting a first mode may include selecting a mode with a lowest resolution. In other implementations, selecting a first mode may include selecting a mode that satisfies one or more performance parameters associated with a current operation. For example, if the DAC 125 undergoes a track seeking operation, then selecting a first mode may include selecting a mode that provides a large voltage swing. As another example, if the DAC 125 undergoes a track following operation, then selecting a first mode may include selecting a mode that provides a highest resolution.

Process 800 then proceeds with determining whether a second mode is available (804). In some implementations, determining whether a second mode is available may include determining whether a second mode with a resolution higher than the first mode is available. If a second mode is not available ("No" branch of operation 804), then the first mode may be set as a default mode of operation (e.g., set as a default mode for operations related to tracking following). If a second mode is available ("Yes" branch of operation 804), process 800 evaluates one or more switching parameters associated with the second mode (806). For example, process 800 may evaluate an average of position errors (e.g., track misregistration) associated with the second mode. As another example, process 800 may evaluate the voltage swing that can be provided by the second mode.

Then, if at least one switching parameter satisfies a predetermined criterion, process 800 includes switching the DAC 125 from the first mode to the second mode (808). In some implementations, switching from the first mode to the second mode includes comparing the at least one switching parameter associated the second mode with a same switching parameter associated with the first mode. In some implementations, the switching parameter associated with the first mode can be used as a predetermined criterion. For example, the voltage range provided by the first mode may be used as the predetermined criterion, and the voltage range provided by the second mode may be compared against the voltage range provided by the first mode. In this example, if the voltage range provided by the second mode is smaller than the voltage range provided by the first mode, then the first mode is switched to the second mode. In implementations in which the at least one switching parameter associated with the second mode does not satisfy a predetermined criterion, the first mode may not be switched to the second mode, and the first mode may be set as a default mode of operation.

Next, process 800 includes analyzing one or more performance parameters after switching from the first mode to the second mode (810). In some implementations, analyzing one or more performance parameters may include analyzing an average value of the position errors associated with the second mode.

In some implementations, the one or more performance parameters also may include track mis-registration, which provides a measurement of a current track with respect to a target track (i.e., position accuracy). However, track misregistration may be affected by various elements in an actual drive system such as vibrations, internal wind flowing due to platter rotation, flex cable bias, coarse resolution and the like. Thus, it may be ideal that a scheme with a low resolution, maximum voltage swing be used for seeking, since this scheme would allow the actuator to move as fast as possible. On the other hand, it may be ideal that a scheme with a minimum voltage swing, high resolution be used for track following because high resolution settings may provide better tracking performance as the actuator can be nudged in smaller, finer steps. In such an scenario, while higher resolution settings may provide better tracking performance, the total voltage that is available for output may not be enough for the disk drive or the actuator to stay on track. For example, assuming that a disk drive needs to output to an associated actuator a voltage of 0.3 volts in order to allow the actuator to stay on track, if the full swing voltage of the actuator at a particular low resolution is +/−1 volt and each successive higher resolution cuts the voltage swing to half, then the actuator may be driven at a next higher resolution at an output of +/−0.5 volts. However, the actuator may not further be driven with a higher resolution because doing so would cut the voltage swing to +/−0.25 volts, which is below the general requirement of 0.3 volts for track following. Thus, in these implementations, analyzing one or more performance parameters may include analyzing the limits of the voltage swing and the resolution setting and determining a suitable voltage swing and resolution swing that allow the actuator to be driven at an optimum point without failing to meet the minimum voltage requirement (e.g., 0.3 volts).

In some implementations, the average value of the position errors associated with the second mode may be compared against the average value of the position errors associated with the first mode. If the one or more performance parameters are satisfactory ("Yes" branch of operation 812) (e.g., if the average value of the position errors associated with the second mode is less than the average value of the position errors associated with the first mode), then process 800 may proceed with setting the second mode as a default mode of operation (814). If the one or more performance parameters are not satisfactory ("No" branch of operation 812), then the second mode may be switched back to the first mode (816), and the first mode may be set as a default mode of operation (818).

One of ordinary skill in the art would recognize that process 800 may be repeated in implementations in which other modes (e.g., a third mode) are available. In these implementations, process 800 may evaluate one or more switching parameters associated with the third mode. If the one or more switching parameters are satisfied, the current mode of operation may be switched over to the third mode. Under the third mode, one or more performance parameters are analyzed. If the one or more performance parameters are not satisfactory, then process 800 may switch back to the previous mode of operation. If the one or more performance parameters are satisfactory, then the third mode may be used as a default mode of operation.

In some implementations, operations 802-818 may be performed in the order listed, in parallel (e.g., by the same or a different process, substantially or otherwise non-serially), or in reverse order to achieve the same result. In another implementations, operations 802-818 may be performed out of the order shown. Also, the order in which the operations are performed may depend, at least in part, on what entity performs the method. Operations 802-818 also may be performed by the same or different entities or systems.

Example Implementations of Hard Disk Drive

Figure 9:
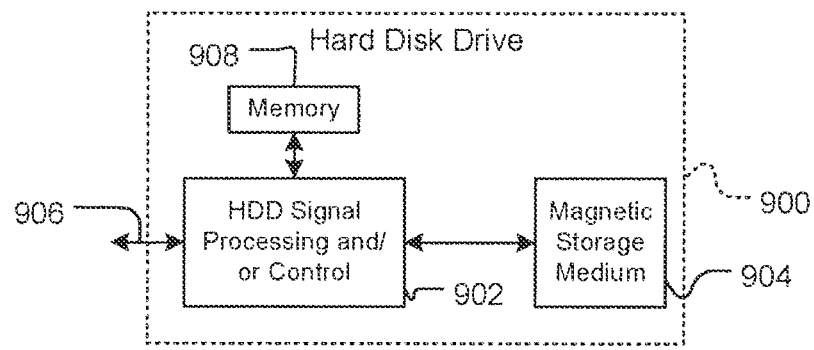
FIGS. 9-15 show various example electronic systems implementing a hard disk drive system.

FIGS. 9-15 show various example implementations of the described systems and techniques. Referring now to FIG. 9, the described systems and techniques can be implemented in a hard disk drive (HDD) 900. The described systems and techniques may be implemented in either or both signal processing and/or control circuits, which are generally identified in FIG. 9 as 902. In some implementations, the signal processing and/or control circuit 902 and/or other circuits (not shown) in the HDD 900 may process data, perform coding and/or encryption, perform calculations, and/or format data that is output to and/or received from a magnetic storage medium 904.

The HDD 900 may communicate with a host device (not shown) such as a computer, mobile computing devices such as personal digital assistants, cellular phones, media or MP3 players and the like, and/or other devices via one or more wired or wireless communication links 906. The HDD 900 may be connected to memory 908 such as random access memory (RAM), low latency non volatile memory such as flash memory, read only memory (ROM) and/or other suitable electronic data storage.

Figure 10:
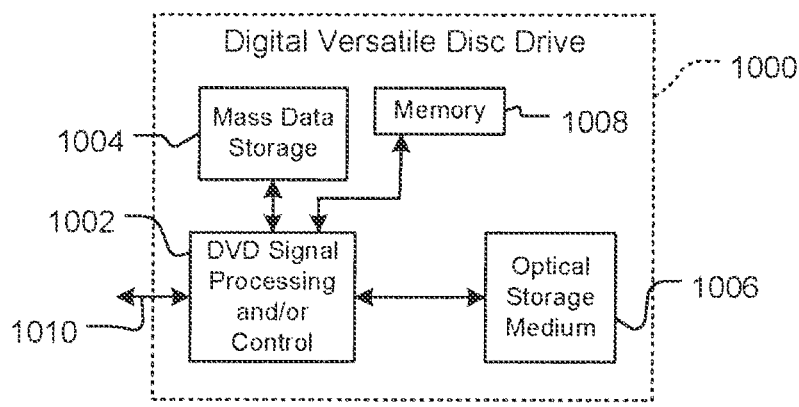

Referring now to FIG. 10, the described systems and techniques can be implemented in a digital versatile disc (DVD) drive 1000. The described systems and techniques may be implemented in either or both signal processing and/or control circuits, which are generally identified in FIG. 10 as 1002, and/or mass data storage 1004 of the DVD drive 1000. The signal processing and/or control circuit 1002 and/or other circuits (not shown) in the DVD drive 1000 may process data, perform coding and/or encryption, perform calculations, and/or format data that is read from and/or data written to an optical storage medium 1006. In some implementations, the signal processing and/or control circuit 1002 and/or other circuits (not shown) in the DVD drive 1000 can also perform other functions such as encoding and/or decoding and/or any other signal processing functions associated with a DVD drive.

The DVD drive 1000 may communicate with an output device (not shown) such as a computer, television or other device via one or more wired or wireless communication links 1010. The DVD drive 1000 may communicate with mass data storage 1004 that stores data in a nonvolatile manner. The mass data storage 1004 may include a hard disk drive (HDD). The HDD may have the configuration shown in FIG. 9. The HDD may be a mini HDD that includes one or more platters having a diameter that is smaller than approximately ⅛". The DVD drive 1000 may be connected to memory 1008 such as RAM, ROM, low latency nonvolatile memory such as flash memory and/or other suitable electronic data storage.

Figure 11:
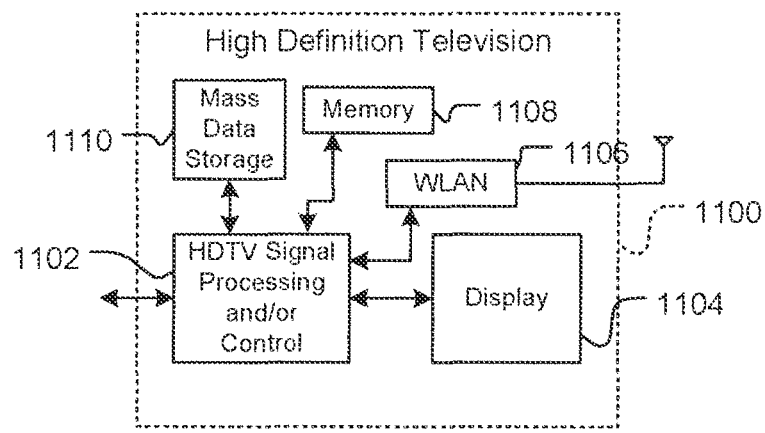

Referring now to FIG. 11, the described systems and techniques can be implemented in a high definition television (HDTV) 1100. The described systems and techniques may be implemented in either or both signal processing and/or control circuits, which are generally identified in FIG. 11 as 1102, a WLAN interface 1106 and/or mass data storage 1110 of the HDTV 1100. The HDTV 1100 receives HDTV input signals in either a wired or wireless format and generates HDTV output signals for a display 1104. In some implementations, signal processing circuit and/or control circuit 1102 and/or other circuits (not shown) of the HDTV 1100 may process data, perform coding and/or encryption, perform calculations, format data and/or perform any other type of HDTV processing that may be required.

The HDTV 1100 may communicate with mass data storage 1110 that stores data in a non volatile manner such as optical and/or magnetic storage devices. At least one HDD may have the configuration shown in FIG. 9 and/or at least one DVD drive may have the configuration shown in FIG. 10. The HDD may be a mini HDD that includes one or more platters having a diameter that is smaller than approximately ⅛". The HDTV 1100 may be connected to memory 1108 such as RAM, ROM, low latency nonvolatile memory such as flash memory and/or other suitable electronic data storage. The HDTV 1100 also may support connections with a WLAN via a WLAN network interface 1106.

Figure 12:
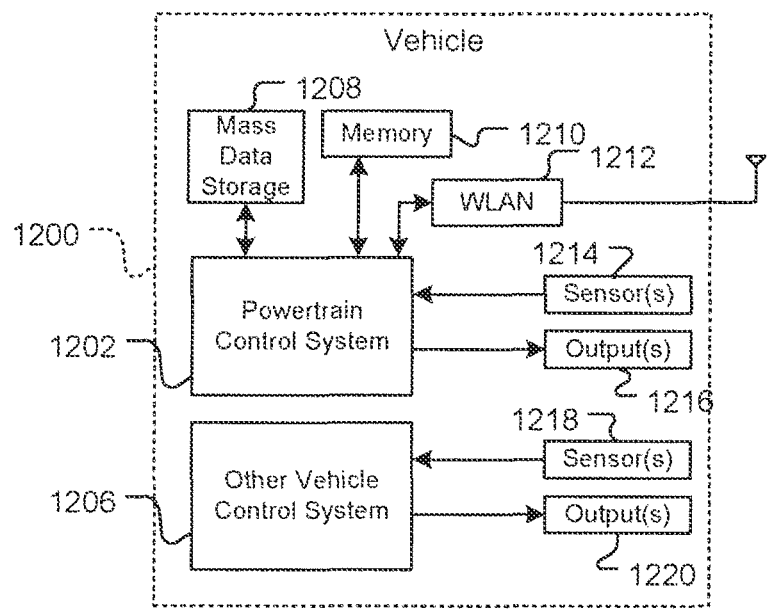

Referring now to FIG. 12, the described systems and techniques may be implemented in a control system of a vehicle 1200, a WLAN interface 1212 and/or mass data storage 1208 of the vehicle control system 1200. In some implementations, the described systems and techniques may be implemented in a powertrain control system 1202 that receives inputs from one or more sensors 1214 such as temperature sensors, pressure sensors, rotational sensors, airflow sensors and/or any other suitable sensors and/or that generates one or more output control signals such as engine operating parameters, transmission operating parameters, and/or other control signals to one or more output devices 1216.

The described systems and techniques may also be implemented in other control systems 1206 of the vehicle 1200. The control system 1206 may likewise receive signals from input sensors 1218 and/or output control signals to one or more output devices 1220. In some implementations, the control system 1206 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1202 may communicate with mass data storage 1208 that stores data in a nonvolatile manner. The mass data storage 1208 may include optical and/or magnetic storage devices for example hard disk drives HDD and/or DVDs. At least one HDD may have the configuration shown in FIG. 9 and/or at least one DVD drive may have the configuration shown in FIG. 10. The HDD may be a mini HDD that includes one or more platters having a diameter that is smaller than approximately ⅛". The powertrain control system 1202 may be connected to memory 1210 such as RAM, ROM, low latency nonvolatile memory such as flash memory and/or other suitable electronic data storage. The powertrain control system 1202 also may support connections with a WLAN via a WLAN network interface 1212. The control system 1206 may also include mass data storage, memory and/or a WLAN interface (all not shown).

Figure 13:
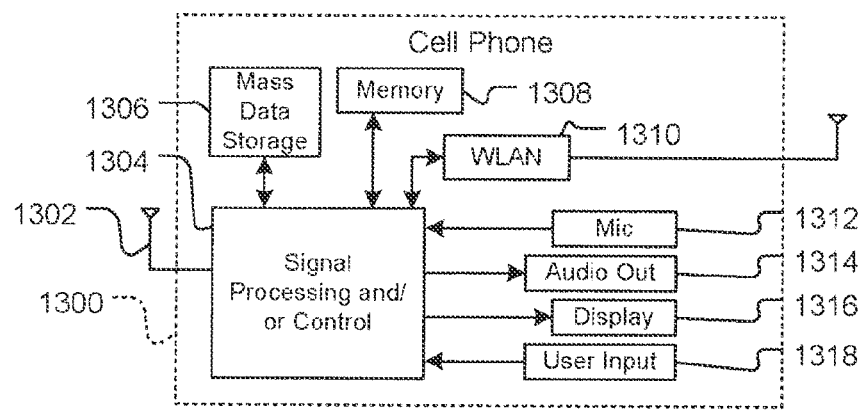

Referring now to FIG. 13, the described systems and techniques can be implemented in a cellular phone 1300 that may include a cellular antenna 1302. The described systems and techniques may be implemented in either or both signal processing and/or control circuits, which are generally identified in FIG. 13 as 1304, a WLAN interface 1310 and/or mass data storage 1306 of the cellular phone 1300. In some implementations, the cellular phone 1300 includes a microphone 1312, an audio output 1314 such as a speaker and/or audio output jack, a display 1316 and/or an input device 1318 such as a keypad, pointing device, voice actuation and/or other input device. The signal processing and/or control circuits 1304 and/or other circuits (not shown) in the cellular phone 1300 may process data, perform coding and/or encryption, perform calculations, format data and/or perform other cellular phone functions.

The cellular phone 1300 may communicate with mass data storage 1306 that stores date in a non volatile manner such as optical and/or magnetic storage devices for example hard disk drives HDD and/or DVDs. At least one HDD may have the configuration shown in FIG. 9 and/or at least one DVD drive may have the configuration shown in FIG. 10. The HDD may be a mini HDD that includes one or more platters having a diameter that is smaller than approximately ⅛". The cellular phone 1300 may be connected to memory 1308 such as RAM, ROM, low latency nonvolatile memory such as flash memory and/or other suitable electronic data storage. The cellular phone 1300 also may support connections with a WLAN via a WLAN network interface 1310.

Figure 14:
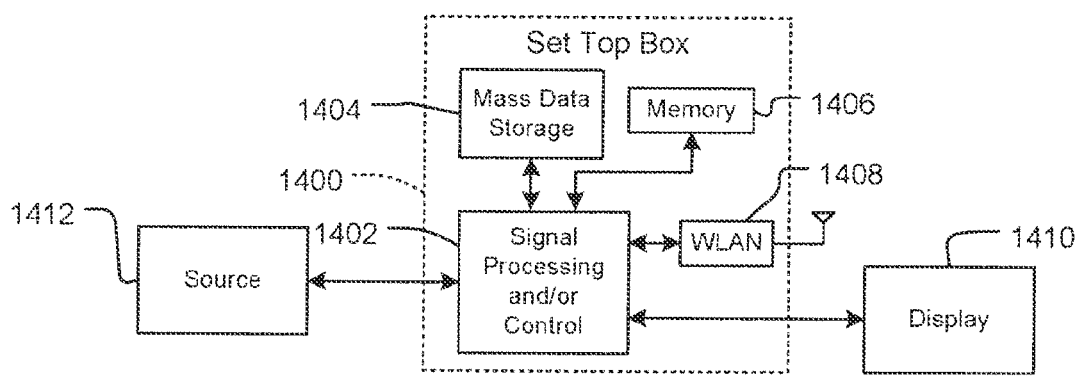

Referring now to FIG. 14, the described systems and techniques can be implemented in a set top box 1400. The described systems and techniques may be implemented in either or both signal processing and/or control circuits, which are generally identified in FIG. 14 as 1402, a WLAN interface 1408 and/or mass data storage 1404 of the set top box 1400. The set top box 1400 receives signals from a source 1412 such as a broadband source and outputs standard and/or high definition audio/video signal suitable for a display 1410 such as a television and/or monitor and/or other circuits (not shown) of the set top box 1400 may process data, perform coding and/or encryption, perform calculations, format data and/or perform any other set top box function.

The set top box 1400 may communicate with mass data storage 1404 that stores data in a nonvolatile manner. The mass data storage 1404 may include optical and/or magnetic storage devices for example hard disk drives HDD and/or DVDs. At least one HDD may have the configuration shown in FIG. 9 and/or at least one DVD may have the configuration shown in FIG. 10. The HDD may be a mini HDD that includes one or more platters having a diameter that is smaller than approximately ⅛". The set top box 1400 may be connected to memory 1406 such as RAM, ROM, low latency nonvolatile memory such as flash memory and/or other suitable electronic data storage. The set top box 1400 also may support connections with a WLAN via a WLAN network interface 1408.

Figure 15:
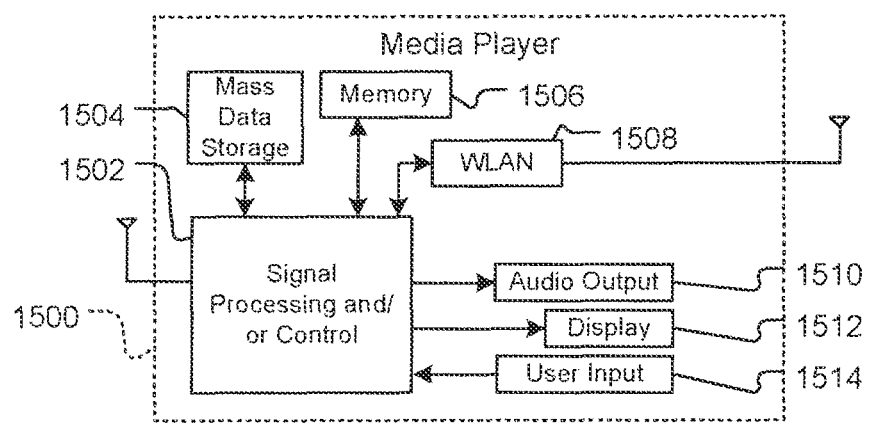

Referring now to FIG. 15, the described systems and techniques can be implemented in a media player 1500. The described systems and techniques may be implemented in either or both signal processing and/or control circuits, which are generally identified in FIG. 15 as 1502, a WLAN interface 1508 and/or mass data storage 1504 of the media player 1500. In some implementations, the media player 1500 includes a display 1512 and/or a user input 1514 such as a keypad, a touchpad and the like. In some implementations, the media player 1500 may employ a graphical user interface (GUI) that typically employs menus, drop down menus, icons and/or a point-and-click interface via the display 1512 and/or user input 1514. The media player 1500 further includes an audio output 1510 such as a speaker and/or audio output jack. The signal processing and/or control circuits 1502 and/or circuits (not shown) of the media player 1500 may process data, perform coding and/or encryption, perform calculations, format data and/or perform any other media player function.

The media player 1500 may communicate with mass data storage 1504 that stores data such as compressed audio and/or video content in a nonvolatile manner. In some implementations, the compressed audio and/or video content in a nonvolatile manner. In some implementations, the compressed audio files include files that are compliant with MP3 (Moving Picture experts group audio layer 3) format or other suitable compressed audio and/or video formats. The mass data storage may include optical and/or magnetic storage devices for example hard disk drives HDD and/or DVDs. At least one HDD may have the configuration shown in FIG. 9 and/or at least one DVD may have the configuration shown in FIG. 10. The HDD may be a mini HDD that includes one or more platters having a diameter that is smaller than approximately ⅛". The media player 1500 may be connected to memory 1506 such as RAM, ROM, low latency nonvolatile memory such as flash memory and/or other suitable electronic data storage. The media player 1500 also may support connections with a WLAN via a WLAN network interface 1508. Still other implementations in addition to those described above are contemplated.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program ( also known as a computer program, software, software application, script, or code), can be written in any form or programming language, including compiled or interpreted languages, or declarative or procedural languages, and it can be deployed in any form, including as a stand alone program or as a module, component, subroutine, or other unit suitable for use in a computing environment. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one side or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. A method comprising:
   selecting, by processing hardware, a first mode associated with digital-analog conversion;
   determining, by the processing hardware, whether a second mode associated with digital-analog conversion is available;
   if the second mode is available, evaluating one or more switching parameters associated with the second mode;
   switching from the first mode to the second mode if the one or more evaluated switching parameters satisfy one or more predetermined criteria;
   analyzing one or more performance parameters after switching from the first mode to the second mode; and
   setting the second mode as a default mode of operation if the one or more analyzed performance parameters are satisfactory.

2. The method claim of 1, further comprising:
   switching from the second mode back to the first mode if the one or more analyzed performance parameters do not meet one or more predetermined thresholds; and
   setting the first mode as a default mode of operation after switching from the second mode back to the first mode.

3. The method claim of 1, where determining whether a second mode is available includes identifying a mode with a resolution higher than a resolution of the first mode.

4. The method of claim 1, where setting the second mode as a default mode of operation includes:
   comparing the one or more performance parameters after switching from the first mode to the second mode with one or more performance parameters before switching from the first mode to the second mode; and
   setting the second mode as a default mode of operation if the one or more performance parameters after switching from the first mode to the second mode demonstrate improvement over the one or more performance parameters before switching from the first mode to the second mode.

5. The method of claim 1, where setting the second mode as a default mode of operation if the one or more analyzed performance parameters are satisfactory includes:
   setting the second mode as a default mode of operation if the one or more analyzed performance parameters meet one or more predetermined thresholds.

6. The method of claim 1, wherein if the second mode is set as the default mode of operation, the method further comprising:
   determining whether a third mode associated with digital-analog conversion is available;
   if the third mode is available, evaluating one or more switching parameters associated with the third mode;
   switching from the second mode to the third mode if the one or more evaluated switching parameters associated with the third mode satisfy a predetermined criteria;
   analyzing one or more performance parameters after switching from the second mode to the third mode; and setting the third mode as a default mode of operation if the one or more analyzed performance parameters after switching from the second mode to the third mode are satisfactory.

7. A system comprising:
a storage device;
a digital-analog conversion module comprising hardware and configured to convert data for use with the storage device; and
a processing module comprising hardware and programmed to select a first mode associated with digital-analog conversion, determine whether a second mode associated with digital-analog conversion is available, evaluate one or more switching parameters associated with the second mode when the second mode is available, switch from the first mode to the second mode when the one or more evaluated switching parameters satisfy one or more predetermined criteria, analyze one or more performance parameters after switching from the first mode to the second mode, and set the second mode as a default mode of operation if the one or more analyzed performance parameters are satisfactory.

8. The system of claim 7, wherein the processing module is programmed to switch from the second mode back to the first mode if the one or more analyzed performance parameters do not meet one or more predetermined thresholds, and set the first mode as a default mode of operation after switching from the second mode back to the first mode.

9. The system of claim 7, wherein the processing module is programmed to determine whether the second mode is available by, at least in part, identifying a mode with a resolution higher than a resolution of the first mode.

10. The system of claim 7, wherein the processing module is programmed to set the second mode as a default mode of operation by, at least in part, comparing the one or more performance parameters after switching from the first mode to the second mode with one or more performance parameters before switching from the first mode to the second mode, and setting the second mode as a default mode of operation if the one or more performance parameters after switching from the first mode to the second mode demonstrate improvement over the one or more performance parameters before switching from the first mode to the second mode.

11. The system of claim 7, wherein the processing module is programmed to set the second mode as a default mode of operation by, at least in part, setting the second mode as a default mode of operation if the one or more analyzed performance parameters meet one or more predetermined thresholds.

12. The system of claim 7, wherein the processing module is programmed to, if the second mode is set as the default mode of operation, determine whether a third mode associated with digital-analog conversion is available, evaluate one or more switching parameters associated with the third mode if the third mode is available, switch from the second mode to the third mode if the one or more evaluated switching parameters associated with the third mode satisfy a predetermined criteria, analyze one or more performance parameters after switching from the second mode to the third mode, and set the third mode as a default mode of operation if the one or more analyzed performance parameters after switching from the second mode to the third mode are satisfactory.

13. A device comprising:
a digital-analog converter; and
circuitry configured to select a first mode associated with digital-analog conversion, determine whether a second mode associated with digital-analog conversion is available, evaluate one or more switching parameters associated with the second mode when the second mode is available, switch from the first mode to the second mode when the one or more evaluated switching parameters satisfy one or more predetermined criteria, analyze one or more performance parameters after switching from the first mode to the second mode, and set the second mode as a default mode of operation if the one or more analyzed performance parameters are satisfactory.

14. The device of claim 13, wherein the circuitry is configured to switch from the second mode back to the first mode if the one or more analyzed performance parameters do not meet one or more predetermined thresholds, and set the first mode as a default mode of operation after switching from the second mode back to the first mode.

15. The device of claim 13, wherein the circuitry is configured to determine whether the second mode is available by, at least in part, identifying a mode with a resolution higher than a resolution of the first mode.

16. The device of claim 13, wherein the circuitry is configured to set the second mode as a default mode of operation by, at least in part, comparing the one or more performance parameters after switching from the first mode to the second mode with one or more performance parameters before switching from the first mode to the second mode, and setting the second mode as a default mode of operation if the one or more performance parameters after switching from the first mode to the second mode demonstrate improvement over the one or more performance parameters before switching from the first mode to the second mode.

17. The device of claim 13, wherein the circuitry is configured to set the second mode as a default mode of operation by, at least in part, setting the second mode as a default mode of operation if the one or more analyzed performance parameters meet one or more predetermined thresholds.

18. The device of claim 13, wherein the circuitry is configured to, if the second mode is set as the default mode of operation, determine whether a third mode associated with digital-analog conversion is available, evaluate one or more switching parameters associated with the third mode if the third mode is available, switch from the second mode to the third mode if the one or more evaluated switching parameters associated with the third mode satisfy a predetermined criteria, analyze one or more performance parameters after switching from the second mode to the third mode, and set the third mode as a default mode of operation if the one or more analyzed performance parameters after switching from the second mode to the third mode are satisfactory.

* * * * *